April 20, 1937.                J. MUROS                2,077,805
                          SHAVING IMPLEMENT
                        Filed Oct. 10, 1936
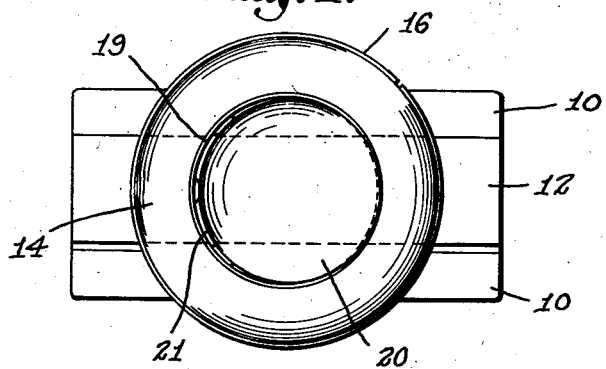
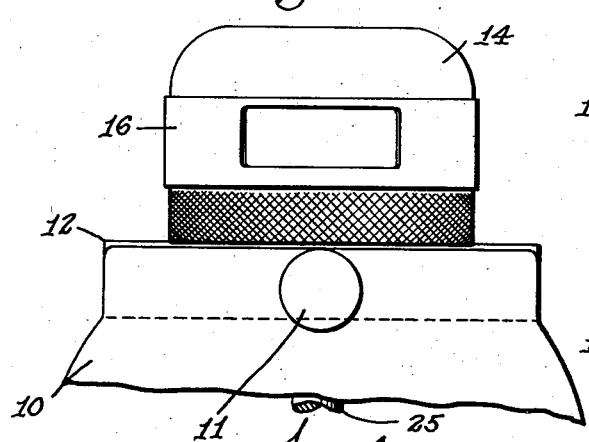
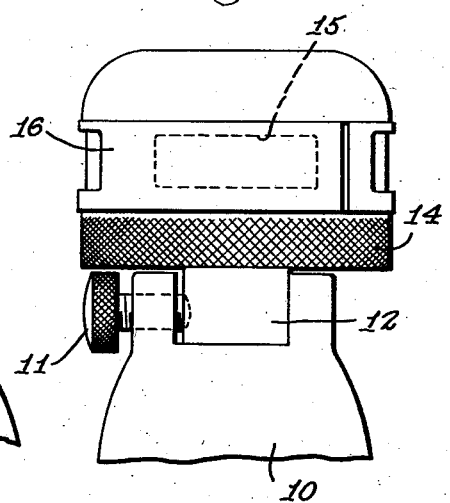
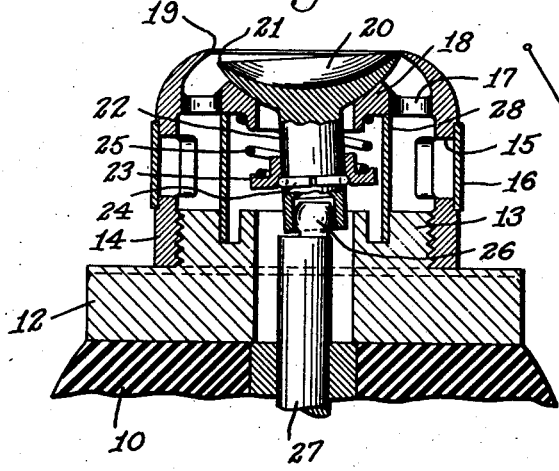
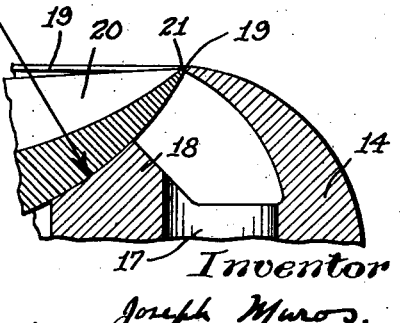
Inventor
Joseph Muros.
by H. W. Kenney
        Attorney Patented Apr. 20, 1937

2,077,805

UNITED STATES PATENT OFFICE 2,077,805

SHAVING IMPLEMENT

Joseph Muros, Cambridge, Mass., assignor to Gillette Safety Razor Company, Boston, Mass., a corporation of Delaware Application October 10, 1936, Serial No. 104,967

20 Claims. (Cl. 30—43)

This invention relates to implements of general application to the shearing, trimming or cutting of sheet material or filamentous material. One important field of use of the invention is in implements for shaving without the use of lather and for purposes of illustration it will be described in that connection.

In one aspect the invention consists in co-operating members presenting curved shearing edges and contacting in spherical guiding or bearing surfaces, together with means for moving one member with respect to the other to impart a progressive circular shearing movement to its edge or to the two co-operating edges. A desirable embodiment of the invention may comprise a stationary outer shearing member having a portion of its inner wall spherically shaped and having a circular continuous or discontinuous shearing edge, in combination with an inner member having a co-operating spherical guiding surface and a circular shearing edge, together with means for imparting a combined rocking and circular or wobbling motion to the inner member causing a shearing opening between the two edges to move circumferentially about the implement and to effect a progressive shearing action.

The two members may be so shaped and related as to present a crescent-shaped opening between their circular shearing edges of any desired amplitude. Where the implement is used for shaving and is intended for cutting hair an opening of perhaps .015″ to .035″ is entirely adequate, although where the implement is designed for cutting sheet material under conditions which are safe for the user a much wider opening may be desired and is entirely practicable.

In another aspect the invention consists in the combination of an outer stationary member presenting opposed cutting edge portions and having a curved cutter seat located between them, together with a rocking cutter supported thereon and presenting oppositely directed cutting edge portions arranged to be brought into cutting relation with the opposed cutting edge portions of the stationary member as the cutter is rocked upon its seat. Viewed from this angle the cutting edge need not be circular nor continuous, nor the seat spherical, although it will be curved to confine the cutter to movement in the desired path.

One desirable manner of imparting the desired movement to the inner member is to move a portion thereof in a circular path which may be concentric with respect to the axis of the member. Under these circumstances the portion of the inner member presenting the movable shearing edge partakes of a wobbling motion, closing the opening at one end and progressively opening it at the other in a circumferential direction about the contour of the stationary shearing edge. Accordingly, hairs which are introduced into the opening as the implement is moved over the face of the user are progressively sheared. The implement is designed to be driven at high speed and consequently to engage and shear all the hairs on the face of the user as the implement is moved across it.

As herein shown the two members are yieldingly maintained in engagement at their spherical guiding surfaces and the friction thus developed is sufficient to prevent the inner member from spinning freely about its own axis, as might be the case if the guiding friction and the friction of the driving connection were approximately equal. Where the guiding friction of the spherical surfaces exceeds the friction of the driving connection it has been found that the inner member will partake of a slow rotational movement in addition to its wobbling movement when the implement is running idly. This is advantageous in that the point of engagement of the two shearing surfaces is thus progressively changed and a progressive self-sharpening action at two points in the circular shearing edge is brought about. Thus the efficiency and effective life of the implement are prolonged with great advantage to the user.

In implements of the present invention the two shearing members may be arranged either externally or internally in respect to each other. In the embodiments of the invention herein shown, however, the inner member is arranged internally with respect to the stationary outer member and this arrangement presents certain striking advantages as applied to shaving implements. For example, the inner member may be given an upwardly concave curvature corresponding to the natural curvature of the skin of the user when subjected to pressure in a circular line of the same diameter. Therefore, since the shearing action takes place in or slightly outside the sphere of this curvature, all danger of cutting is avoided and consequently a shearing opening of substantial amplitude may be maintained without slightest danger to the user. It follows, that in operation, one part of the stationary circular shearing edge of the implement is exposed as a shearing edge while the diametrically opposite point thereof is acting only as a guard. As relative movement is imparted to the members the sides of the shearing edge alternate in the functions of shearing and guarding.

Another advantageous feature of this type of implement is that the curved walls of the outer member may be shaped substantially like a scoop and so are extremely effective in engaging and straightening bent-over hairs and bringing them into the shearing opening. It has been found in practice that an implement of this type, in which a stationary hair-lifting edge is employed, is much more comfortable for the user than one in which the hairs are first engaged by a vibrating member.

These and other features of the invention will be best understood and appreciated from the following description of a preferred embodiment thereof, selected for purposes of illustration and shown in the accompanying drawing, in which:—

Fig. 1 is an end view on an enlarged scale of a dry shaving implement;

Fig. 2 is a similar view in front elevation, a portion of the casing being broken away;

Fig. 3 is a similar view in side elevation;

Fig. 4 is a similar view in longitudinal section; and

Fig. 5 is a fragmentary sectional view on a still larger scale.

The illustrated implement includes in its structure a casing 10 of which only a portion is shown in Figs. 2, 3, and 4 and which may serve as a handle for the implement and as a housing for the motor actuating it. In the upper end of the casing 10 a rectangular metallic head 12 is secured by means of a clamping screw 11 and upon this head are mounted the operative parts of the implement. The head 12 is provided with an upstanding circular boss 13 threaded upon its outer surface. Upon the boss 13 is screwed a casing 14 having a cylindrical body portion terminating at its upper edge in a spherical portion cut by a horizontal plane in which lies a circular shearing edge 19. The cylindrical portion of the casing is provided with two or more rectangular apertures 15 which are normally closed by a flat ring 16 which is rotatable in ways turned in the outer wall of the casing 14. The ring 16 is provided with windows which may be brought into registration with the opening 15 of the casing when it is desired to remove from the interior of the implement the shaving debris which collects therein during its use.

The casing 14 is provided with a perforated internal web 17 near its upper end or adjacent to the plane in which the cylindrical body of the casing merges into its spherical end portion. In the web 17 is formed a circular annular shoulder 18 having its inner face formed as an annular spherical surface or seat. This surface constitutes one of the two spherical guiding surfaces above referred to and the circular shearing edge 19 of the casing constitutes one of the two co-operating shearing edges of the implement.

The inner or cutter member of the implement includes in its structure a cup-shaped portion 20 concave upwardly and provided with a circular peripheral shearing edge of substantially the same diameter as the shearing edge 19 of the outer member or casing 14. The cup-shaped portion 20 is formed integral with a downwardly extending cylindrical shank 22 upon which is loosely mounted a collar 23. This is limited in its downward movement by a split ring 24 removably contained in a circumferential groove formed in the shank 22. Between the collar 23 and the lower surface of the shoulder 18 is interposed a compression spring 25 and this serves yieldingly to hold the cup-shaped member 20 upon its spherical seat. The shank 22 is provided in its lower end with a concentric recess for the reception of an eccentric driving stud 26 having a spherical surface and projecting from the upper end of the motor shaft 27.

A sleeve 28 encloses the shank 22 and the parts carried thereby and forms with the walls of the casing 14 an annular chamber in which is received the shaving debris which falls through the perforations of the web 17. The sleeve is pressed into an annular groove formed in the upper surface of the boss 13 and encloses the shank 22 with adequate clearance for its movement.

In Fig. 4 the driving stud 26 is shown in position at the right-hand end of its path. Consequently, the inner member is rocked downwardly upon its left-hand side and the shearing edge 21 of the cup-shaped portion 20 stands below the stationary shearing edge 19 of the outer member by an appreciable amount which in practice may be .035". This is the mid point of a crescent-shaped shearing opening formed between the two circular shearing edges 19 and 21. As the motor shaft 27 is rotated a circular movement, concentric about the axis of the shaft, is imparted to the lower end of the shank 22, with the result that a wobbling motion is imparted to the cup-shaped portion 20 causing the shearing opening to travel circumferentially about the stationary shearing edge 19. Accordingly, any hairs which are introduced into the shearing opening are severed as the implement is moved across the face of the user. It is contemplated that the motor shaft 27 will be driven at a relatively high rate of speed, for example, at least 3600 R. P. M. Consequently, as the implement is moved across the face of the user the passage of the shearing opening is so rapid that all hairs are given an opportunity to enter it and are sheared before being withdrawn by traversing movement of the implement.

It will be noted that the center of curvature of the spherical guiding surfaces is external to the implement, as indicated in Fig. 5. Consequently, the rocking component of the movement of the inner member takes place about this point as an axis. The rocking component is combined with a circular movement defined by the spherical guiding surfaces and generated by the circular movement of the eccentric driving stud 26. The resultant movement of the cup-shaped portion 20 is herein termed for convenience a wobbling movement, its result being a progressive shearing movement of the edge 21 circumferentially about the stationary shearing edge 19 of the outer member.

The casing 14 may be easily removed at any time to permit access to the interior of the implement by merely unscrewing it from the boss 13. The compression spring 25 tends always to move the inner member to a central position in which the shank 22 is concentric with respect to the casing and this occurs when the casing is removed and the driving connection with the eccentric stud interrupted. The parts may be easily reassembled and the driving connection re-established in the process.

While the spherical bearing surfaces are herein shown as being formed in integral parts of the co-operating members, it is contemplated that they may be provided as separate bushings if desired. Other mechanical changes in proportion and arrangement may also be made within the scope of the appended claims.

Having thus described my invention what I claim as new and desire to secure by Letters Patent of the United States is:—

1. An implement of the class described having co-operating members presenting shearing edges and spherical guiding surfaces, and means for imparting a circular movement to a portion of one of said members.

2. An implement of the class described having co-operating members presenting shearing edges and spherical guiding surfaces, and means for imparting a wobbling movement to one of said members.

3. An implement of the class described having co-operating members presenting circular shearing edges and spherical guiding surfaces, together with means for holding said members together with a crescent shaped opening between their shearing edges and for moving one member with respect to the other to cause said opening to travel circumferentially.

4. An implement of the class described having co-operating members presenting curved shearing edges and contacting in spherical bearing surfaces, together with means for moving one member with respect to the other to impart a progressive circular shearing movement to its edge.

5. An implement of the class described having inner and outer co-operating members presenting circular shearing edges and spherical guiding surfaces spaced respectively from said shearing edges, and mechanism for imparting a wobbling movement to the inner of said members.

6. An implement of the class described having a stationary outer member presenting a circular shearing edge lying in a predetermined plane, a movable inner member presenting a co-operating shearing edge lying in a single plane located at all times at an angle to the plane of the shearing edge first mentioned, and means for rocking and turning said inner member.

7. An implement of the class described having a hollow member presenting a circular shearing edge, an inner member movably mounted within said member and also presenting a circular shearing edge, and means for moving said inner member to effect a progressive shearing action.

8. An implement of the class described having a hollow member presenting an annular shearing edge, an inner member having a concave face bounded by a circular shearing edge, and mechanism for imparting a relative wobbling movement to said members.

9. An implement of the class described having a hollow member presenting an annular shearing edge and having an internal web presenting a circular guiding seat, an inner member having an inwardly convex face arranged to slide upon said circular guiding surface, and mechanism for rocking and turning the inner member on its seat.

10. An implement of the class described having an outer member presenting an overhanging circular shearing edge and having an internal spherical seat, an inner member having a cup-shaped portion concave on substantially the natural curvature of the user's skin when engaged by said outer member, bounded by a circular shearing edge and having a spherical bearing portion, and mechanism for turning and rocking the inner member on its seat.

11. An implement of the class described having a hollow member presenting a circular shearing edge, an inner member also presenting a circular shearing edge and having a spherical seat within said outer member, means for yieldingly holding the two members in contact at said seat, and mechanism for rocking and turning said inner member.

12. An implement of the class described having an outer member presenting a circular shearing edge, an inner member also presenting a circular shearing edge and having a spherical bearing seat with a center of curvature external to the implement, and mechanism for rocking and turning said inner member upon its seat.

13. An implement of the class described having an outer member presenting a circular shearing edge disposed in a predetermined plane, an inner member also presenting a circular shearing edge disposed in a predetermined plane, and means for rocking and turning the latter member with said planes occupying always an angular relationship.

14. An implement of the class described having co-operating members presenting circular shearing edges and having spherical contact surfaces, and an eccentric driving connection to one of said members developing less friction than is developed at said spherical surfaces, whereby combined rocking, turning and spinning movements are imparted to the latter member.

15. An implement of the class described having an outer member presenting a circular shearing edge and enclosing a chamber for the reception of shaving debris, an inner member having a spherical seat in said outer member, an eccentric driving connection for the latter member, and means for opening or closing said chamber.

16. An implement of the class described having co-operating shearing members with spherical bearing surfaces, and a spring tending at all times to move one of said members to a predetermined position with respect to the other.

17. An implement of the class described having co-operating shearing members one presenting an annular bearing surface and the other having a correspondingly curved bearing surface and a shank disposed within said annular surface, and a spring encircling said shank and tending to center it in concentric relation with said annular surface.

18. An implement of the class described having a stationary outer member presenting an overhanging shearing edge and having a curved internal bearing seat, an inner member having a correspondingly curved bearing surface and an upwardly concave face bounded by a shearing edge, and means for rocking said inner member on its seat to move its edge upwardly into shearing relation with the overhanging edge of said outer member.

19. An implement of the class described having a base provided with an upstanding threaded boss, a cylindrical casing threaded upon said boss, having a shearing edge at its upper end and an internal spherical seat, an inner member having a correspondingly curved surface movably engaged with said seat, a cup-shaped shearing portion and a downwardly extending shank, and means for holding said members in yielding engagement, whereby they may be removed with the casing from the base as an assembled unit.

20. An implement of the class described comprising a stationary outer member presenting opposed cutting edge portions and having a concave cutter seat located between said edge portions, and a rocking cutter supported for bodily movement thereon and presenting oppositely directed cutting edge portions arranged to be brought into cutting relation with the opposed cutting edge portions of the stationary member as the cutter is rocked on its seat.

JOSEPH MUROS.